(12) United States Patent
Mansfield et al.

(10) Patent No.: US 7,013,172 B2
(45) Date of Patent: Mar. 14, 2006

(54) HYPERSPECTRAL IMAGING CALIBRATION DEVICE

(75) Inventors: James R. Mansfield, Boston, MA (US); Jenny E. Freeman, Weston, MA (US); Michael E. Leventon, Lexington, MA (US); Michael J. Hopmeier, Mary Esther, FL (US); Derek Brand, Brighton, MA (US)

(73) Assignee: HyperMed, Inc., Weston, MA (US)

( * ) Notice: Subject to any disclaimer, the term of this patent is extended or adjusted under 35 U.S.C. 154(b) by 0 days.

(21) Appl. No.: 10/896,232

(22) Filed: Jul. 22, 2004

(65) Prior Publication Data

US 2005/0007584 A1  Jan. 13, 2005

Related U.S. Application Data (62) Division of application No. 09/986,105, filed on Nov. 7, 2001, now Pat. No. 6,810,279.

(60) Provisional application No. 60/246,093, filed on Nov. 7, 2000.

(51) Int. Cl.
*A61B 5/05* (2006.01)
(52) U.S. Cl. ...................... 600/407; 600/437
(58) Field of Classification Search ........ 600/407–472; 356/243.1, 300, 301, 326; 382/207; 250/316.1, 250/334, 339.09
See application file for complete search history.

(56) References Cited

U.S. PATENT DOCUMENTS

| 4,035,085 | A |  | 7/1977 | Seiner |
| 4,047,032 | A |  | 9/1977 | Judge et al. |
| 5,924,981 | A |  | 7/1999 | Rothfritz et al. |
| 6,008,492 | A | * | 12/1999 | Slater et al. ............... 250/334 |
| 6,081,612 | A |  | 6/2000 | Gutkowicz-Krusin et al. |
| 6,111,640 | A |  | 8/2000 | Hedman et al. |

FOREIGN PATENT DOCUMENTS

| EP | 0 490 428 A2 | 6/1992 |
| GB | 1211302 | 11/1970 |
| WO | 97/47235 | 12/1997 |
| WO | 98/37805 | 9/1998 |

* cited by examiner

*Primary Examiner*—Ali Imam
(74) *Attorney, Agent, or Firm*—Powell Goldstein LLP (57) ABSTRACT

Hyperspectral imaging calibration devices and methods for their use are described that generate images of three dimensional samples. A calibration device may assume the shape of a desired imaging sample such as a body part and may be sterile prior to placement. The calibration device may include openings or may be modified to expose a region of the sample during use. Spectral images, typically obtained at multiple wavelengths, are made of the calibration device. Algorithms are provided that utilize the spectral images of the calibration device to determine the effects of lighting conditions and sample shape on the sample image to form a calibrated image. Calibrated images produced by these devices and methods can provide information, including clinical data that are less sensitive to lighting and sample shape compared to alternative technologies.

21 Claims, 4 Drawing Sheets

Surface patch at point x

HYPERSPECTRAL IMAGING CALIBRATION DEVICE

REFERENCE TO RELATED APPLICATIONS

This application is a divisional of application Ser. No. 09/986,105, filed Nov. 7, 2001, issued U.S. Pat. No, 6,810,279 on Oct. 26, 2004, which claims priority to U.S. Provisional application No. 60/246,093, entitled "Hyperspectral Imaging Calibration Device" filed Nov. 7, 2000.

FIELD OF THE INVENTION

This invention relates to hyperspectral imaging calibration devices and methods of using the devices.

DESCRIPTION OF THE INVENTION

Spectroscopy, whether visible, near infrared, infrared or Raman, is an enormously powerful tool for the analysis of biomedical samples (e.g. U.S. Pat. Nos. 6,081,612; 5,784,162). The medical community, however, definitely prefers imaging methods, as exemplified by methods such as MRI and CT scanning as well as standard X-ray photography and ultrasound imaging. This is entirely understandable, as many factors need to be taken into account for a physician to make a clinical diagnosis; imaging methods potentially can provide far more information to a physician than their non-imaging counterparts. With this medical reality in mind, there has been considerable effort put into combining the power and versatility of imaging method with the specificity of spectroscopic methods.

Near-infrared (near-IR) spectroscopy and spectroscopic imaging can measure the balance between oxygen delivery and tissue oxygen utilization by monitoring the hemoglobin oxygen saturation in tissues. For in-vivo human studies, the forearm or leg has been the investigational site for many of the noninvasive near-IR studies. Non-imaging near-IR applications have examined the local response of tissue to manipulations of blood flow. Clinically, there are situations where the regional variations in oxygenation saturation are of interest. Near-IR imaging offers a means of accessing the spatial heterogeneity of the hemoglobin oxygenation saturation response to tissue perfusion.

Non-invasive monitoring of hemoglobin oxygenation exploits the differential absorption of $HbO_2$ and Hb, along with the fact that near-IR radiation can penetrate relatively deeply into tissues. Pulse oximetry routinely supplies a noninvasive measure of arterial hemoglobin oxygenation based on the differential red-visible and near infrared absorption of Hb and $HbO_2$. Visible/near-IR multispectral imaging permits the regional variations in tissue perfusion to be mapped. Unlike infrared thermography, hyperspectral imaging alone does not map the thermal emission of the tissues; instead, this imaging method relies on the differential absorption of light by the Hb and $HbO_2$, resulting in differences in the wavelength dependence of the tissue reflectance depending on the hemoglobin oxygen saturation of the tissue.

Spectroscopic imaging methodologies and data are becoming increasingly common in analytical laboratories, whether it be magnetic resonance (MRI), mid-IR, Raman, fluorescence and optical microscopy, or near-IR/visible-based imaging. The volume of information contained in spectroscopic images can make standard data processing techniques cumbersome (e.g. U.S. Pat. No. 5,845,639). Furthermore, there are few techniques that can demarcate which regions of a spectroscopic image contain similar spectra without a priori knowledge of either the spectral data or the sample's composition. The objective of analyzing spectroscopic images is not only to determine what the spectrum is at any particular pixel in the sample, but also to determine which regions of the sample contain similar spectra; i.e., what regions of the sample contain chemically related compounds. Multivariate analysis methodologies can be used to determine both the spectral and spatial characteristics of a sample within a spectroscopic imaging data set. These techniques can also be used to analyze variations in the temporal shape of a time series of images either derived for extracted from a time series of spectroscopic images.

There are few techniques that can demarcate which regions of a sample contain similar substances without a priori knowledge of the sample's composition. Spectroscopic imaging provides the specificity of spectroscopy while at the same time relaying spatial information by providing images of the sample that convey some chemical meaning. Usually the objective in analyzing heterogeneous systems is to identify not only the components present in the system, but their spatial distribution. The true power of this technique relative to traditional imaging methods lies in its inherent multivariate nature. Spatial relationships among many parameters can be assessed simultaneously. Thus, the chemical heterogeneity or regional similarity within a sample is captured in a high dimensional representation which can be projected onto a number of meaningful low dimensional easily interpretable representations. Representations typically comprise a set of composite image each of which has a specific meaning. This is perhaps the unique element behind spectroscopic imaging.

While it is now clear that both infrared spectroscopy and spectroscopic imaging can play roles in providing medically relevant information, the raw spectral or imaging measurement seldom reveals directly the property of clinical interest. One cannot easily determine whether the tissue is cancerous, blood glucose concentrations and the adequacy of tissue perfusion.

Over the years, various methods have been devised to collect spectroscopic images. Generally in such cases, a spectroscopic imaging experiment generates data in the form of what is often called a spectral image cube, spectroscopic imaging data cube or just hypercube. This is a three dimensional array of data, consisting of two spatial dimensions (the imaging component), and one spectral dimension. The array can be thought of as an array of spatially resolved individual spectra, with every pixel in the first image consisting of an entire spectrum, or as a series of spectrally resolved images. In either representation, the 3D data cube can be treated as a single entity and it can contain enormous amounts of spatial and spectral information about the sample from which it was acquired.

A hyperspectral imaging system can acquire images at hundreds of wavelengths, as opposed to the three colors seen by humans. The added sensitivity allows such devices to accurately measure properties of the sample, such as hydration or oxygenation. However, the devices are also sensitive to many sources of variance, including both environmental conditions (such as lighting, temperature, humidity) and shading and shadowing due to object shape.

The hyperspectral image can be represented as $I(x, \lambda)$, which indicates the amount of light of wavelength $\lambda$ that falls on the imaging plane at position x. The quantity $I(x, \lambda)$ is a function of many factors that do not relate to the characteristic of the object being imaged. To accurately compute the desired object properties these factors have to be addressed. For example, the lighting conditions may involve very complex functions of both intensity and wavelength. The surface of the object may consist of various structures that cause shading changes as the normal vector to the surface changes with respect to the viewing direction.

Unfortunately, there has been no satisfactory solution to compensating the vagaries and distortions that complicate 3-dimensional imaging measurements, particularly from biological tissues or body parts. For example, U.S. Pat. No. 6,271,913 issued on Aug. 7, 2001 to Jung et al. describes a system for determining tooth color, in an effort to get around the effect of ambient light on shade color. Wunderman et al. in U.S. Pat. No. 6,122,042 issued Sep. 19, 2000 describe the use of "a collection of light sources having substantially distinct wavelength envelopes and activated in a rapid sequence of distinct combinations" together with a complicated apparatus that comprises a collection of spatially distributed light detectors to optically characterize objects. The Wunderman system thus involves a great deal of hardware.

A simpler system that can detect biological problems is desired. Richards-Kortum et al. teach, in U.S. Pat. No. 6,095,982 issued on Aug. 1, 2000 the use of in vivo fluorescence measurements followed by in vitro NIR Raman measurements to detect cancerous conditions. Unfortunately, while this system requires fewer light generators and detectors, the technology uses samples that have been removed from a body and cannot accommodate various shaped body parts, particularly at a distance from the instrumentation.

Another approach that has been tried to minimize the scattering problem in the context of non-invasive glucose monitoring by optical means has been to generate sufficient signal and then limit the solid angle of illumination and detection. Block et al. in U.S. Pat. No. 6,064,065, issued May 16, 2000 describes such a system. However, this system requires particular attention to the angle of light entry and exit, and is not as suitable for biological samples that are to be imaged in three dimensions, and particularly cannot handle biological objects at a distance from the spectroscopic instrumentation.

A removable calibration device has been tried to overcome problems, as described in U.S. Pat. No. 6,045,502 issued on Apr. 4, 2000 to Epstein. However, that system cannot suitably cover a three dimensional object such as an arm or leg, and cannot create or handle imaging information from a distance. Accordingly much more remains to be done in this field.

SUMMARY OF THE INVENTION

In contrast with the above reviewed devices and methods known, the invention allows detailed spectroscopic information to be obtained from a three dimensional living object at a distance from the object. Moreover, the invention corrects the visual image information to generate higher quality images as suited for clinical analyses.

One embodiment of the invention is a hyperspectral image calibration pad, wherein the pad is form fitting to a sample to assume the shape of that sample, and has at least one surface exterior to the body part with the following optical properties: at least 95% opaque to electromagnetic radiation over at least a 50 nanometer wavelength range, preferably at least a 100 nanometer range, more preferably at least a 200, 400, 800 or more nanometer range; has a predetermined reflectance of, for example, at least 1 percent, preferably at least 2 percent, more preferably at least 5 percent, 10 percent, 25 percent or more, to wavelengths of light over said wavelength range; has a reflectance value for at least a first wavelength within said predetermined nanometer wavelength range that varies less than 10% over a desirable image region; and has a reflectance value for at least a second wavelength within said predetermined nanometer wavelength range that varies less than 10% over a desirable image region.

Another embodiment of the invention is a hyperspectral image calibration pad, wherein the pad is form fitting to a sample to assume the shape of that sample, and has at least one surface exterior to the body part with the following optical properties: at least 95% opaque to electromagnetic radiation between 400 and 500, 400 and 700, 400 and 1100, 400 and 1800, and 400 and 2400 nanometer wavelength; has a reflectance of at least 1 percent, preferably at least 2, 5, 10 or 25 percent to wavelengths of light between 400 and 1800 nm; has a reflectance value for at least a first wavelength that varies less than 10% over a desirable image region; and has a reflectance value for at least a second wavelength that varies less than 10% over a desirable image region.

Another embodiment of the invention is a method of calibrating the hyperspectral imaging of a sample, comprising the steps of: placing a disposable hyperspectral imaging calibration pad over the sample; acquiring a hyperspectral image of the calibration pad at two or more wavelengths; determining an intensity variance of a hyperspectral image that includes lighting condition information for each wavelength; and determining an intensity variance of a hyperspectral image that corrects for the shape of the object in the imaging region.

Yet another embodiment of the invention is a system for obtaining spectral information from the surface of a body part comprising: a calibrator that is form fitting to the body part to assume the shape of that part, and has at least one surface exterior to the body part that reflects light at two or more wavelengths; and a hyperspectral imaging instrument that has a light source and an imaging-quality wavelength-separation device that can image light at the two or more wavelengths to generate spectral information from the calibrator.

Yet another embodiment of the invention is a system for obtaining electromagnetic spectral information from the surface of a sample comprising: a calibrator that is form fitting to the sample to assume the shape of that sample, and has at least one surface exterior to the sample that reflects electromagnetic rays at two or more wavelengths; and a hyperspectral imaging instrument that has a light source and an imaging-quality wavelength-separation device that can image reflected electromagnetic energy at the two or more wavelengths to generate spectral information from the calibrator.

Other embodiments will be appreciated from a reading of the patent specification.

DETAILED DESCRIPTION OF THE PREFERRED EMBODIMENTS

Figure 1:
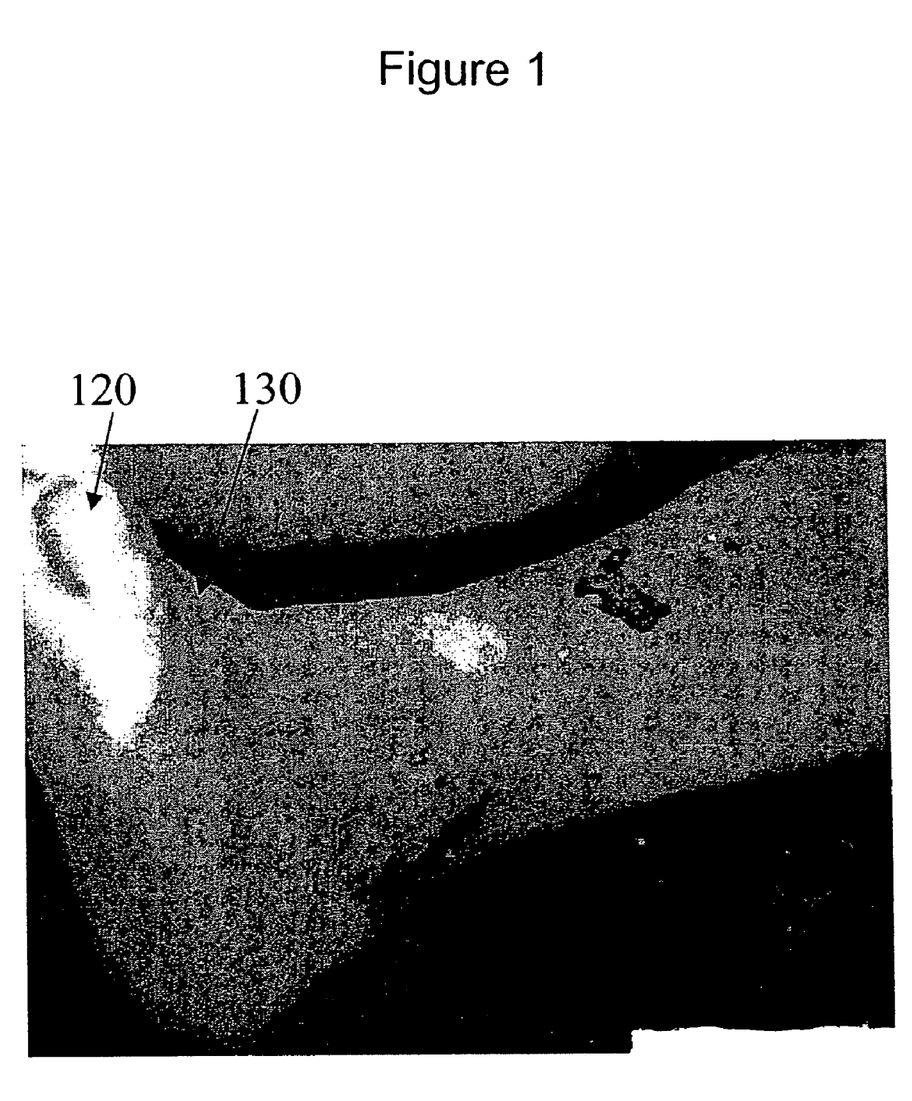
FIG. 1 shows an image of an ulcerated ankle from a diabetic patient.
Figure 2:
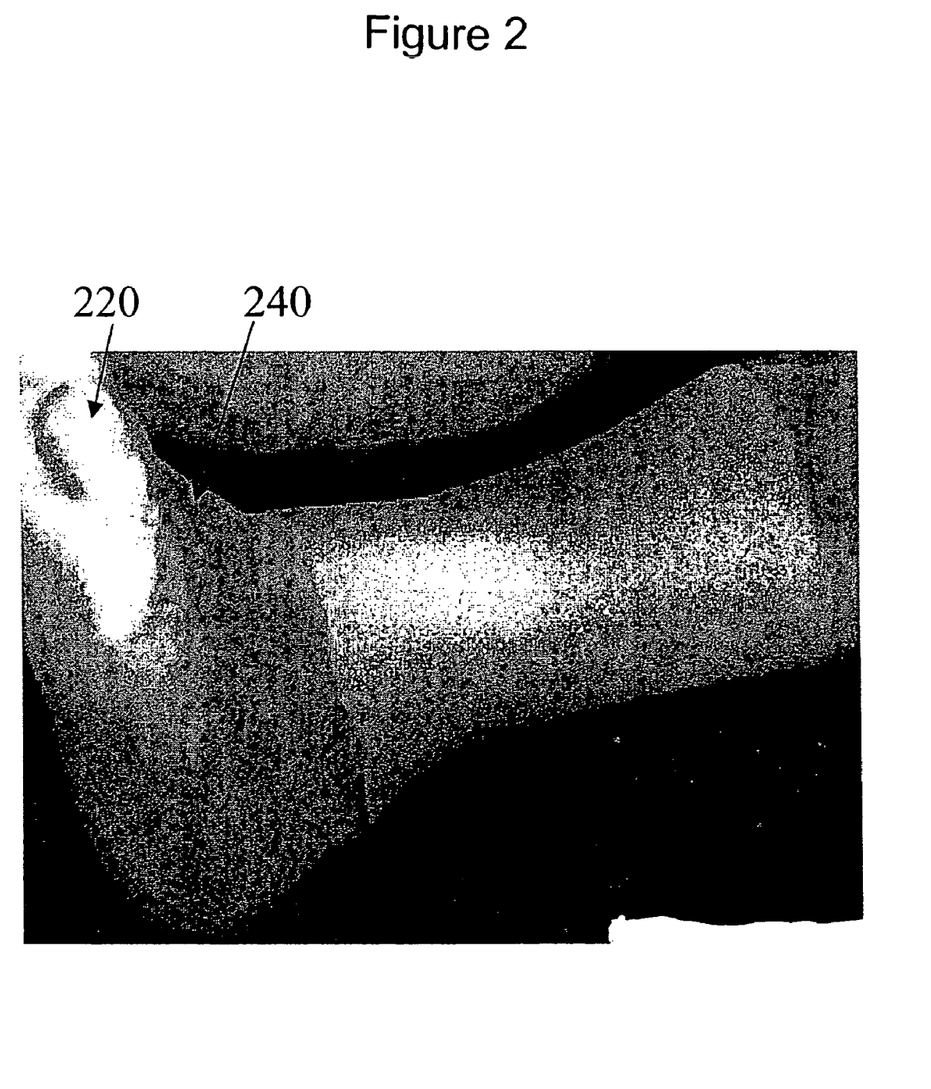
FIG. 2 shows an image of an ulcerated ankle from a diabetic patient covered with an opaque conforming calibration device pad that reflects light over a wide wavelength range.

The inventors studied the problem of reproducible imaging from three dimensional surfaces and discovered conforming calibration devices (termed "pad" herein) and methods that alleviate the problems seen previously with testing of such irregular surfaces. Such calibration devices are "conforming" in that they assume the shape of the sample surface and, because of this, provide signal(s) that correct for the three dimensional qualities of the image. FIGS. 1 and 2 show an example of how the invention may be used. FIG. 1 is an image of an ankle from a diabetic patient. FIG. 2 is a conforming calibration device image of the same body part. The image intensity obtained from FIG. 2, according to one embodiment, is used to calibrate the image obtained from FIG. 1 to generate a more accurate set of data for diagnosis of the clinical status of the patient.

The inventors also discovered flat calibration devices and methods that alleviate the problems seen previously with testing of irregular surfaces and the invention includes such flat calibration devices as well.

Unlike devices reviewed above, conforming calibration devices of embodiments of the invention assume the shape of the sample to be imaged and are used to generate a rich calibration signal that includes optical signal components to correct for factors such as distance between various points of the sample and the imager light source, shadows, and inhomogeneity of the optics and electronics over the visual field. This improved ability to correct for such variations provides much greater sensitivity and reproducibility in the measurements. In one embodiment an entire outer surface of a calibrator pad that covers a sample is imaged. In another embodiment a portion of the calibrator pad (desirable image region) is imaged. The higher quality measurements translate directly into more accurate diagnoses and lower cost compared with measurements made without benefit of a conforming calibration device. Flat calibration devices according to the invention also provide higher quality measurements.

A sample that is imaged according to embodiments of the invention typically is a body part but can be any biological object. The invention is particularly useful for imaging analysis of any and all skin, including hands, feet, ankles, legs, arms, faces, scalps and the like. Embodiments of the invention are useful for organs, such as hearts during open heart surgery, tumors on almost any body part that can have pictures taken of it by laparoscopy or endoscopy (using an imaging fiber bundle passed inside the body) or during surgery, and other structures in the body that are amenable to imaging diagnosis.

Suitable Calibration Devices

The calibration device comprises an imaging reflectance standard that may be in the form of a sterile pad, another conforming device, or a flat device. The term "pad" is meant to include each such device. The reflectance properties of the standard are known at various wavelengths in the visible and near infrared. The pad preferably is conformable and is designed with the ability to flex such that it may match the contour of the object onto which it is placed.

The calibration device can be made of virtually any material. Cloth, paper and painted wood have been used successfully but other materials such as white ceramics, foams and plastics also are useful. A calibration device may be sprayed or painted on, and may, in some cases take the form of a liquid or paint. It is preferred that the material provides strong reflectance at each wavelength used for spectral imaging. In an embodiment the device may not be white but may be gray or even to have some color.

A calibration device may be of any shape suitable for covering the sample. The calibration device may be, for example, bandage, single flat patch or other recognizable shape that is held against the body part by a fastener, tensioner, or by the use of adhesives that are either an integral part of the pad or originally separate from the pad and later applied. The shape may be irregular or any geometric form such as, for example, a rectangle, a circle, a polygon, a triangle, a square, a rectangle or an oval. A skilled artisan will readily appreciate the proper shape, flexibility and reflectance properties for a calibration device according to embodiments of the invention.

The conforming and flat calibration devices according to embodiments of the invention may be specially modified as desired to provide further advantages. One advantage in this respect is a conforming calibration device that is opaque to some wavelengths but not others. This embodiment of the invention allows the generation of one or more calibration reflectance signal that, for example, corrects three dimensional surface effects, while allowing the use of one or more diagnostically important wavelengths that the conforming calibration device may be transparent to.

Figure 3:
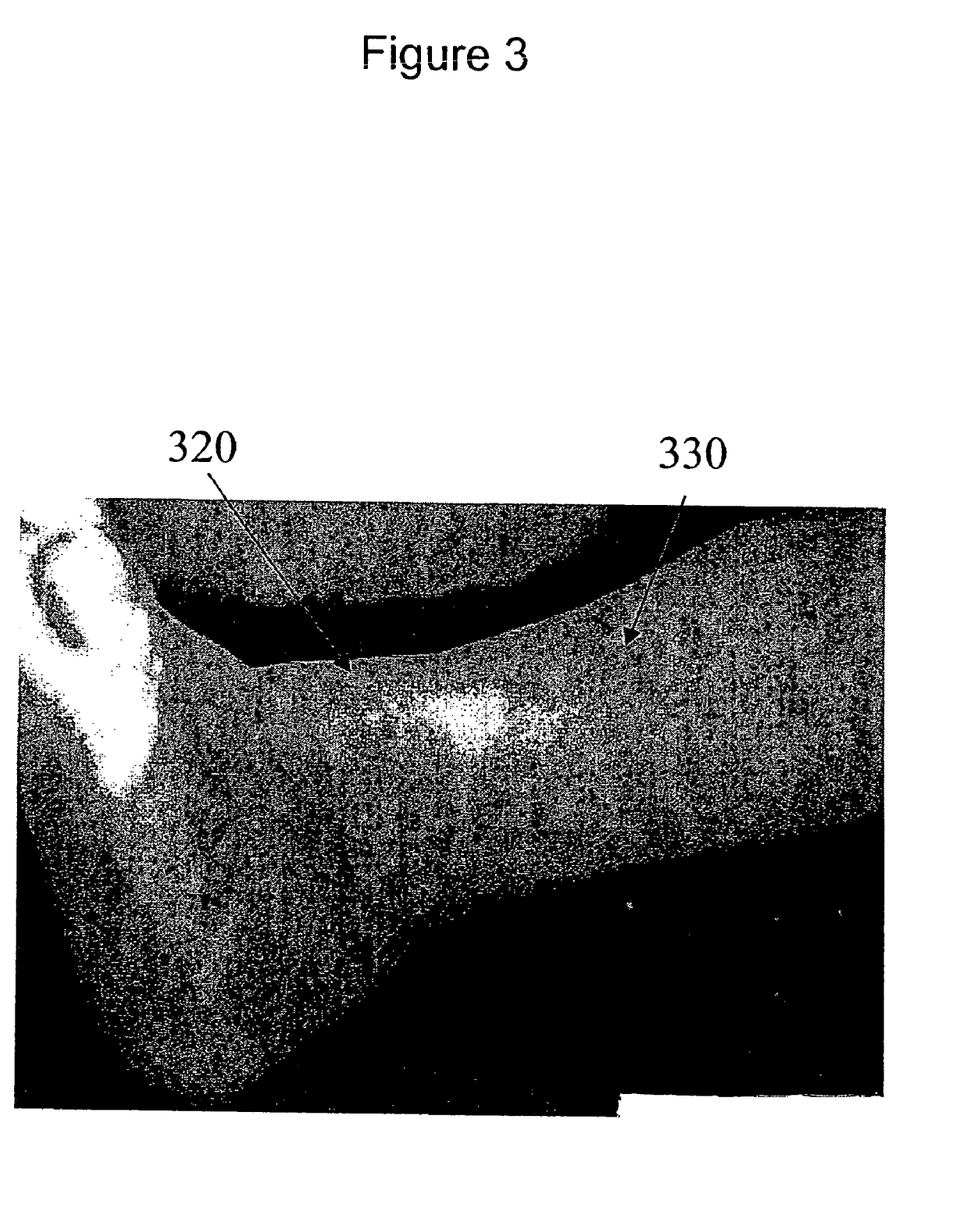
FIG. 3 shows an image of an ulcerated ankle from a diabetic patient covered with a conforming calibration device pad that is partly transparent to light over a wide wavelength range.

FIG. 3 shows an image obtained of an ankle from a diabetic patient wherein all wavelengths are transmitted and wherein image fidelity is maintained. The calibration device, in a preferred embodiment is opaque in the wavelength range of, for example, 400 to 1800 nm. In the case of an opaque calibration device, preferably at least 95% of photons are stopped by the calibration device, more preferably at least 99% of the photons are stopped and most preferably at least 99.9% or even 100% are stopped. The calibration device, in a preferred embodiment has a known wavelength-dependence to the reflectance of light from it. This may be an equal reflectance across all wavelengths so that the calibration device appears white or gray, or it may be an unequal dependence such that the calibration device appears to have a color. Polarization aspects may be used to achieve wavelength ranges and/or reflectances achieved or to further filter the electromagnetic radiation.

In embodiments of the invention a calibration device has less than 10% variation in spectral reflectance among regions (arbitrarily defined as squares of one millimeter on a side) of one square millimeter size. In preferred embodiments a calibration device has less than 5% variation among regions and in more preferred embodiments a calibration device has less than 2% variation and even more preferably less than 1% variation among regions. The spatial relationship depends on the size of the object being measured. Accordingly, in other embodiments of the invention the evenness of reflectance is about 1 part in 100 to 1 part in 500 of whatever dimensions the object is being measured. For example, to measure an object 100 cm in length and 100 cm in width, it is desired to have at least 1 cm spatial evenness down to 0.2 cm spatial evenness. For an object 1 cm square, it is desired to have 20 to 100 micron evenness.

Use and Optional Treatment of Pad During Use to Generate Imaging Data

The calibration device may be held on by straps or fasteners or simply draped over the part to be imaged. The calibration device may, for example, be stuck on with a temporary adhesive on the backside, taped over the area using surgical tape or another fastening device or material.

The calibration device may deposit or transfer one or more fiducial marks onto the surface of the sample, where the mark(s) remain following removal of the device. In addition, the calibration device may have on its surface visible to the imaging device one or more fiducial marks. A fiducial mark can be used as an aid in registering, lining up, or otherwise organizing images after data collection. One problem that can be alleviated by the use of fiducial marks is that a sample can sometimes move or alter size within the field of the camera. Markings on the calibration device or markings transferred from the calibration device to the sample also can be used as a ruler to determine the spatial dimensions of the sample independently of the distance of the sample to the imaging device.

Depending on the application the mark may be applied in a form that remains in place on the skin for minutes, one or more hours, one or more days, one or more weeks and even one or more months. An example of a marker is non-indelible ink. The mark may be a small point or may be a larger surface of defined geometric or even irregular size. A mark can be made from any material as long as the mark has a sharp edge and is of a predefined shape and in a predefined orientation with respect to another mark, if present. In a preferred embodiment, one or more fiducial marks may be used to orient the camera, the sample, the subject, or the register image for calibration and/or image acquisition.

In one embodiment a single mark is applied of known orientation and shape as a reference point for the calibration device. In another embodiment two or more marks are applied. A mark can assume any shape such as for example, an irregular shape, a geometric shape, and one or more lines. A mark may be of any color or set of colors. The mark(s) if used, may help orient the imaging data, but may have other uses as well.

One embodiment of the invention is a conforming or flat calibration device that becomes transparent to one or more wavelengths light on demand. The term "on demand" means the time that a user selects, by, for example, wetting the device with a fluid, applying a voltage or performing some other act that changes the optical properties of the device. The ability to change the optical properties may be exploited, for example, by obtaining an imaging calibration signal of the three dimensional object using the dry conforming calibration device pad, contacting the calibration device with a liquid, by for example, immersing the calibration device in water or another fluid that can change the calibration device's optical properties, and then obtaining another set of data using one or more wavelengths that transmit through the wetted calibration device. In another embodiment a material is used that is opaque when wet and transmits one or more wavelengths of light when dry. By "transmit" is meant that at least 10% of the signal passes through the wetting calibration device. More preferably at least 50% and yet more preferably at least 75% passes through the wetted calibration device.

It is important to maintain image fidelity for transparency. When the calibration device becomes less opaque and transmits light, it is important that the calibration device become transparent, and not translucent. Skilled materials engineers and others will readily appreciate other ways to make a flexible material such as a man-made polymer or fabric transparent when desired. In one such case application of a voltage to a material alters the spectral qualities of the material in an expected way. That is, a user causes a voltage to be applied to the material when the alteration is desired.

In preferred embodiments the conforming or flat calibration device may be aseptic. In related embodiments an aseptic conforming calibration device acts as a bandage and protects contact of the covered part for an extended period of time, such as 1 day, 2 days, 3 days, and 1 week.

The term "wavelength" as used here means a range of electromagnetic radiation having a mean wavelength of the stated value and wherein the intensity (number of photons at a wavelength) drops off at higher and lower wavelengths from this mean. The term "electromagnetic radiation" includes not only visible light radiation, but also ultraviolet, infrared, x-ray and microwave radiation, as devices and materials are known that sense such radiation and can be used to image the device. Preferred embodiments use two or more wavelengths of visible light within a wavelength range where the calibrator is opaque (blocking preferably at least 25%, 50%, 75% and more preferably more than 95% of the light) yet reflects at least some of the light (preferably at least 25% and more preferably more than 50% of incident light at that wavelength). Embodiments include a wavelength range of 400 to 700 nanometers, 400 to 1100 nanometers, 400 to 1800 nanometers, and 400 to 2200 nanometers. Other wavelength ranges are possible.

Depending on the application, there are various methods of acquiring the image of the object after performing the calibration. Known methods and materials related to their use such as that taught in U.S. Pat. Nos. 6,111,640; 6,045,502; 6,002,482 are also specifically contemplated for embodiments of the invention.

The calibration device may be removed once a calibration image is acquired. Optionally, a portion of the pad may be removed, leaving one or more windows to the sample. A skilled artisan will readily appreciate how to construct and use a pad with a peel-off, twist off or dissolving portion, and that can leave one or more optical openings in the pad. In one embodiment the optical opening contains a transparent material that covers the sample. In another embodiment an index matching substance, such as a gel, is interposed between the optional transparent material and the body part surface to minimize specular reflection. In another embodiment, the window is a lambertian reflector to reduce specular reflectance.

Image Data Analysis

Figure 4:
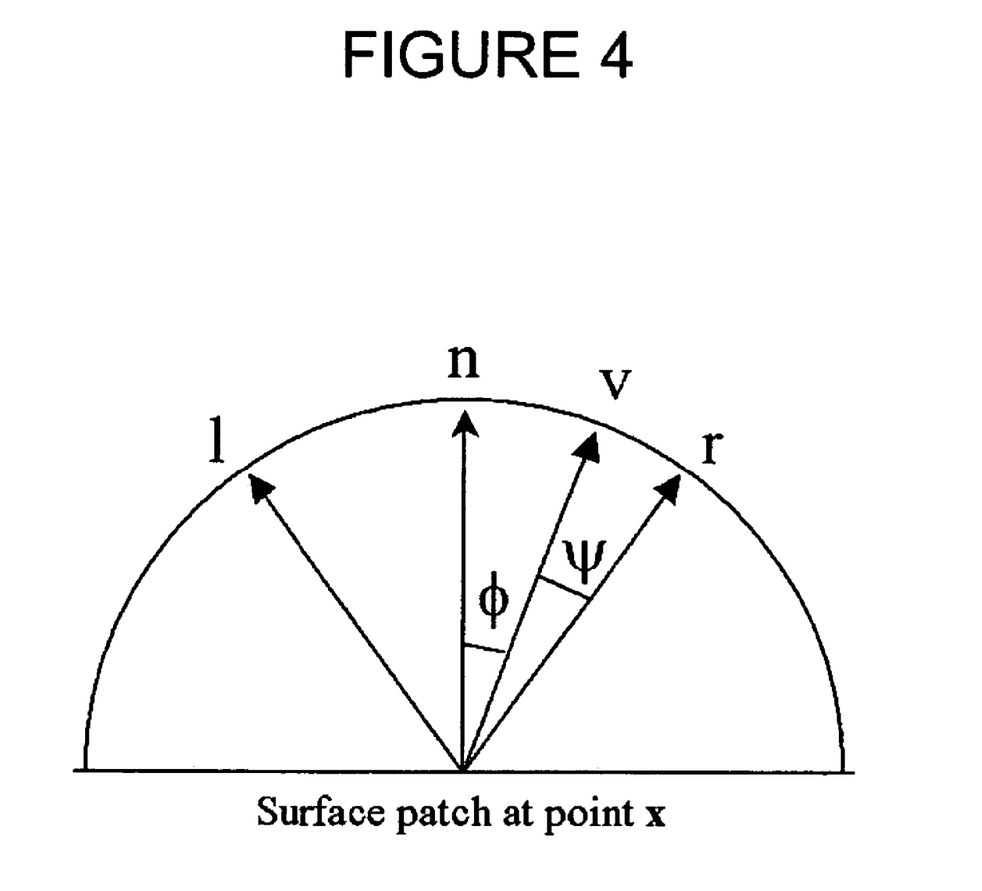
FIG. 4 shows one embodiment of an imaging model for image data analysis.

Data obtained from use of the calibration device can be manipulated for a wide range of diagnostic purposes. A preferred imaging model (see FIG. 4) used to account for the external lighting and object shape is as follows:

$$I(x, \lambda) = L(x, \lambda) R_d(x,\lambda) \cos(\phi(x)) + L(x, \lambda) R_s(x, \lambda) \cos^{K(x,\lambda)}(\psi(x))$$

where $I(x, \lambda)$—The image intensity at point x and wavelength $\lambda$.

$L(x, \lambda)$—The intensity of light from the lamp at wavelength $\lambda$ that hits point x.

$R_d(x, \lambda)$—Diffuse reflectance of the object at point x for wavelength $\lambda$.

$R_s(x, \lambda)$—Specular reflectance of the object at point x for wavelength $\lambda$.

$K(x, \lambda)$—Specular exponent of the object at point x for wavelength $\lambda$.

$n(x)$—the normal to the surface patch at point x.

l—the direction from which the light emanates.

v—the viewing direction.

r—the reflectance direction (n·l)=(n·r).

φ—The angle between the viewing direction and the surface normal direction at point x.

ψ—The angle between the viewing direction and the reflectance direction.

The quantities $R_d(x, \lambda)$, $R_s(x, \lambda)$, $K(x, \lambda)$ each contain information about the characteristics of the underlying tissue. However, since the imaging device is sensitive to the lighting parameters, surface normal, and view angle, the terms $L(x, \lambda)$, $\phi(x)$, $\psi(x)$ in the above equation must accounted for. By placing a flat, matte reflectance standard in front of the object, the light intensity, $L(x, \lambda)$, as a function of position and wavelength can be determined. However, the shape of the object will cause shading to occur in the image that cannot be compensated with a flat reflectance card. Instead, we consider a form-fitting standard that also allows measurement of the angle between the viewing direction and normal direct at each point on the object. If the object is matte, the true reflectance of the object is known from the image once $\cos(\phi+(x))$ and $L(x, \lambda)$ are known. Specular reflectance also affects the image. By adding a known specular component to the calibration standard, the angle $\psi(x)$ can also be determined.

Another type of calibration issue important to spatial imaging of functional tissue properties is spatial alignment. If the object or the camera moves over time, the spatial location x in the image will correspond to different portions of the tissue. Registration techniques can be used to compensate for various types of motion. If the calibration device has visible fiducial markers, the positions of those markers can be tracked over time to register one image to the other, ensuring that the same spatial location on the tissue is tracked between image acquisitions. The calibration device may also be used to account for variations in the viewing angle such as a parallax affect.

Other embodiments and uses of the invention will be apparent to those skilled in the art from consideration of the specification and practice of the invention disclosed herein. All references cited herein, including all U.S. and foreign patents and patent applications, are specifically and entirely incorporated by reference. It is intended that the specification be considered exemplary only, with the true scope and spirit of the invention indicated by the following claims.

The invention claimed is:

1. A method of calibrating the hyperspectral imaging of a sample, comprising the steps of:
   a. placing a disposable hyperspectral imaging calibration pad over the sample;
   b. acquiring a hyperspectral image of the calibration pad at two or more wavelengths;
   c. determining an intensity variance of a hyperspectral image that includes lighting condition information for each wavelength; and
   d. determining an intensity variance of a hyperspectral image that corrects for the shape of the object in the imaging region.

2. The method of claim 1 further comprising a step of determining the spatial dimensions of the acquired hyperspectral image from data obtained with the calibration pad.

3. The method of claim 1 further comprising a step of orienting using one or more fiducial marks in conjunction with calibration information.

4. A method of hyperspectral imaging calibration comprising the steps of:
   a. placing a disposable hyperspectral imaging calibration pad over a sample to be imaged;
   b. acquiring a hyperspectral image of the hyperspectral imaging calibration pad at a plurality of wavelengths;
   c. removing at least a portion of the hyperspectral imaging calibration pad to expose a portion of the underlying sample; and
   d. acquiring a hyperspectral image of the remaining disposable hyperspectral imaging calibration pad and the exposed underlying sample at two or more wavelengths.

5. The method of claim 4 wherein the spatial dimensions of the acquired hyperspectral image are determined from information obtained from the calibration pad.

6. The method of claim 4 wherein the three dimensional structure of the sample is determined from information obtained from the calibration pad.

7. The method of claim 4 further comprising the steps of:
   e. determining an intensity variance of the hyperspectral image due to the lighting conditions by incorporating the reflectance properties of the reflectance standard at each wavelength;
   f. determining an intensity variance of the hyperspectral image due to the shape of the object in the imaging region; and
   g. analyzing the hyperspectral image of the sample after removal of the intensity variance of the hyperspectral image due to lighting and shape, thereby inferring one or more properties of the sample.

8. The method of claim 7 wherein the spatial dimensions of the acquired hyperspectral image are determined from information obtained from the calibration pad.

9. The method of claim 7 wherein the three dimensional structure of the sample is determined from information obtained from the calibration pad.

10. A method of hyperspectral imaging calibration comprising the steps of:
    a. placing a disposable hyperspectral imaging calibration pad over a sample to be imaged such that a region of interest of the sample is visible through or under the hyperspectral imaging calibration pad at one or more wavelengths of interest;
    b. acquiring a hyperspectral image of the disposable hyperspectral imaging calibration pad and of the exposed sample at one or more wavelengths;
    c. determining an intensity variance of a hyperspectral image due to lighting conditions by incorporating the reflectance properties of the calibration pad at each wavelength;
    d. determining an intensity variance of a hyperspectral image due to the shape of the sample in the imaging region; and
    e. analyzing the hyperspectral image of the exposed sample after removal of intensity variance due to lighting and shape, thereby inferring one or more properties of the sample.

11. The method of claim 10 wherein the spatial dimensions of the acquired hyperspectral image are determined from information obtained from the calibration pad.

12. The method of claim 10 wherein the three dimensional structure of the sample is determined from information obtained from the calibration pad.

13. The method of claim 10 wherein the disposable hyperspectral imaging calibration imaging pad is used to determine the spatial dimensions of the acquired hyperspectral image.

14. The method of claim 10 wherein the disposable hyperspectral imaging calibration pad is used to determine the three dimensional structure of the sample.

15. The calibration pad of claim 10 wherein the pad has a shape of a rectangle, a circle, a polygon, a triangle, a square, a rectangle or an oval.

16. The calibration pad of claim 10 wherein the pad is a single flat patch against the body part by a fastener, a tensioner, or an internal or external adhesive.

17. A system for obtaining spectral information from the surface of a body part comprising:
  a. a calibrator that is form fitting to the body part to assume the shape of that part, and has at least one surface exterior to the body part that reflects light at two or more wavelengths; and
  b. a hyperspectral imaging instrument that has a light source and detector capable of detecting a two dimensional image at the two or more wavelengths and which further comprises a computer with a program for calculating an intensity variance as a function of the lighting conditions for a hyperspectral image, using detected reflectance values from the calibrator at the two or more separate wavelengths.

18. A system for obtaining spectral information from the surface of a body part comprising:
  a. a calibrator that is form fitting to the body part to assume the shape of that part, and has at least one surface exterior to the body part that reflects light at two or more wavelengths; and
  b. a hyperspectral imaging instrument that has a light source and an imaging-quality wavelength-separation device that can image light at the two or more wavelengths to generate spectral information from the calibrator.

19. The system of claim 18 wherein the imaging-quality wavelength-separation device is a liquid crystal tunable filter or an acousto-optical tunable filter.

20. The system of claim 18 wherein the instrument is a laparoscope or an endoscope.

21. A system for obtaining electromagnetic spectral information from the surface of a sample comprising:
  a. a calibrator that is form fitting to the sample to assume the shape of that sample, and has at least one surface exterior to the sample that reflects electromagnetic rays at two or more wavelengths; and
  b. a hyperspectral imaging instrument that has a source of electromagnetic rays and an imaging-quality wavelength-separation device that can image reflected electromagnetic rays at the two or more wavelengths to generate spectral information from the calibrator.

* * * * *